DIFFERENTIAL FREQUENCY RATE CIRCUIT COMPRISING LOGIC COMPONENTS

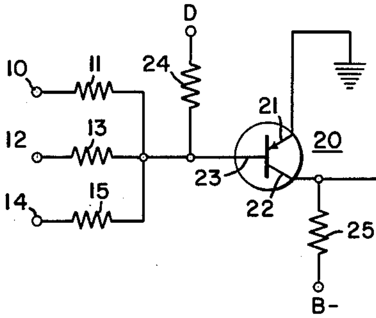
Fig. 1
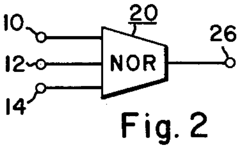
Fig. 2
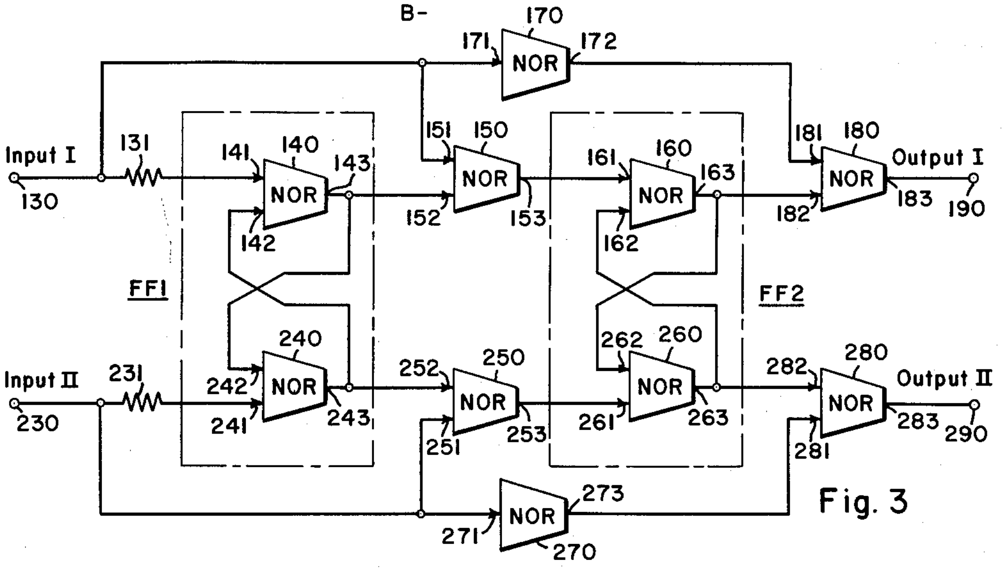
Fig. 3
| | Output Conditions Of NOR Elements | | | | | | | | | |
|---|---|---|---|---|---|---|---|---|---|---|
| | FF1 | | | | FF2 | | | | | |
| | 140 | 240 | 150 | 250 | 160 | 260 | 170 | 270 | 180 | 280 |
| 1st Pulse Appears on Input I | 0 | 1 | 0 | 0 | 1 | 0 | 0 | 1 | 0 | 0 |
| 1st Pulse on Input I Drops to "0" | 0 | 1 | 1 | 0 | 0 | 1 | 1 | 1 | 0 | 0 |
| 2nd Pulse Appears on Input I | 0 | 1 | 0 | 0 | 0 | 1 | 0 | 1 | 1 | 0 |
| 1st Pulse Appears on Input II | 1 | 0 | 0 | 0 | 0 | 1 | 1 | 0 | 0 | 0 |
| 1st Pulse on Input II Drop to "0" | 1 | 0 | 0 | 1 | 1 | 0 | 1 | 1 | 0 | 0 |
| 2nd Pulse Appears on Input II | 1 | 0 | 0 | 0 | 1 | 0 | 0 | 1 | 0 | 1 |
Fig. 4
WITNESSES
John C. Healy, Jr.
James H. Young
INVENTOR
James Dobbie
BY R. J. Brodahl
ATTORNEY 2,985,773

James Dobbie, Cheektowaga, N.Y., assignor to Westinghouse Electric Corporation, East Pittsburgh, Pa., a corporation of Pennsylvania Filed Jan. 28, 1959, Ser. No. 789,610

13 Claims. (Cl. 307—88.5)

This invention relates to circuits which furnish an output on either of two output lines which is equal to the difference in pulse rates between two corresponding lines of input pulses. When the input on a first input line is the highest, the corresponding output line should contain this difference while the output of the other output line should be zero, and vice versa. This invention relates particularly to differential rate circuits utilizing static logic elements.

Accordingly, it is an object of this invention to provide an improved differential rate circuit.

It is another object of this invention to provide an improved differential rate circuit utilizing static logic components, shown in a preferred embodiment as transistorized logic components.

It is another object of this invention to provide a differential rate circuit which furnishes an output on either of two lines which is equal to the difference in pulse rates received between two corresponding input lines of input pulses.

Further objects of this invention will become apparent from the following description when taken in conjunction with the accompanying drawing. In said drawing, for illustrative purposes only, there is shown a preferred embodiment of this invention.

Figure 1 is a schematic diagram of a circuit which may be utilized to perform the logic function used in this invention;

Fig. 2 is a symbolic representation of a logic element performing the function of Fig. 1;

Fig. 3 is a block diagram of a differential rate circuit embodying the teachings of this invention; and Fig. 4 is an operation table which clarifies the method of operation of the apparatus shown in Fig. 3.

Referring to Fig. 1, the schematic diagram illustrates the use of a transistor 20 to perform a logical function commonly known to those skilled in the art as the NOR logic function. A NOR logic function is performed by a circuit apparatus which has a first output voltage level only if neither an input A, nor an input B, nor an input C, is present. If the logic function is performed in a binary system, then the NOR logic circuit has an output of "one" only if neither an input A, nor an input B, nor an input C, is "one." If any of the plurality of inputs to the NOR logic circuit is "one," then the output of the logic circuit is "zero."

The transistor 20 of Fig. 1 comprises a semi-conductive body having an emitter electrode 21, a collector electrode 22 and a base electrode 23. The emitter electrode 21 is connected to ground. The base electrode 23 is connected to a plurality of input terminals 10, 12, and 14 through their respective isolating impedances 11, 13, and 15. The base electrode 23 is also connected through a resistor 24 to a B+ bias supply. The collector electrode 22 is connected through a current-limiting resistor 25 to a B— voltage supply source. The collector 22 is also connected to an output terminal 26.

In operation, the B+ bias supply biases the transistor 20 to cutoff through the resistor 24. Thus, when there are no input signals at the terminals 10, 12, 14, the transistor 20 is cut off and an output will appear at the terminal 26 which will be approximately the value of the B— supply. If a negative input pulse, sufficient in magnitude to drive the transistor 20 to a fully saturated condition, is applied to one of the terminals 10, 12, 14, the transistor 20 will conduct and there will be no output at the terminal 26. Therefore, it may be seen that the apparatus illustrated in Fig. 1 performs the NOR logic function as hereinbefore described. That is, when a negative input pulse is present at any one of the input terminals 10, 12, 14, the output at the terminal 26 will be "zero." If no input signals are present at the terminals 10, 12, 14, the output at the terminal 26 will be "one."

Although the apparatus of Fig. 1 is shown as using a PNP type of transistor, an NPN type of transistor may be utilized if the polarities of the bias voltage, supply voltage, and the input signals are reversed. For a further description of the operation and characteristics of a NOR logic circuit, such as the one illustrated in Fig. 1, reference is made to a copending application Serial No. 628,332, entitled "NOR Elements for Control Systems" filed December 14, 1956, and assigned to the same assignee as the present invention.

Referring to Fig. 2, there is shown the symbol representing a circuit which performs a NOR logic function which may be utilized in the layout of systems utilizing NOR logic components for the purposes of simplicity and clarity. The symbol shown in Fig. 2 has been extensively utilized in the literature of the art in connection with the NOR logic function.

Referring to Fig. 3, there is a block diagram of a differential rate circuit embodying the teachings of this invention. Two pulse trains are injected on Input I and Input II. The output from the circuit will come from either Output I or Output II. If the frequency of the pulses on Input I is greater than the pulses on Input II then the output of the circuit will appear on Output I and this will be a pulse train at the difference frequency, i.e., $f_1-f_2$. If $f_2$ is greater than $f_1$ then the output will appear on Output II, said output being a pulse train with a frequency of $f_2-f_1$. If two frequencies on the Inputs I and II are equal, then the pulse output on Outputs I and II will be zero. Such a device for detecting the difference in pulse rates between two lines of input pulses is useful in many fields of application, for example, digital speed regulators, and synchronizing position controls.

The embodiment of the invention as illustrated in Fig. 3 comprises, in addition to the input and output lines before noted, a first flip-flop element FF1 and a second flip-flop element FF2. The two outputs of the flip-flop FF1 are coupled to the two inputs of the flip-flop FF2 by NOR logic element units 150 and 250. The two outputs of the flip-flop element FF2 are coupled to the Output lines I and II by NOR logic elements 180 and 280, respectively. The output NOR logic elements 180 and 280 are coupled to the Input lines I and II by NOR logic elements 170 and 270, respectively. The coupling NOR logic elements 150 and 250 are also connected to the Input lines I and II, respectively.

The flip-flop element FF1 comprises a pair of NOR logic elements 140 and 240 having cross-coupled inputs and outputs. That is, an output 143 of the NOR logic element 140 is connected to an input 242 of the NOR logic element 240. An output 243 of the NOR logic element 240 is connected to an input 142 of the NOR logic element 140. The flip-flop element FF2 comprises a pair of NOR elements 160 and 260 having cross-connected outputs and inputs. That is, an output 163 of the NOR element 160 is connected to an input 262 of the NOR element 260. An output 263 of the NOR element 260 is connected to an input 162.

Since the operation of the flip-flops FF1 and FF2 are identical, only the operation of FF1 will be described. As stated hereinbefore, a NOR logic element has an output only when neither a first nor a second nor any of a plurality of input signals are present. Assume that the NOR logic element 140 has an output at the output 143. The output 143 is connected to the input 242 of the NOR element 240 preventing the NOR element 240 from producing an output. When the NOR element 140 receives an input at a second input 141 the NOR element 140 ceases producing an output at the output 143. Therefore, the input at 242 of the NOR element 240 is removed and the NOR element 240 produces an output at the terminal 243. The output of the NOR element 240 at 243 is then fed back to the input 142 of the NOR element 140 and prevents the NOR element 140 from producing an output even though the input at 141 is removed. Similarly, an input signal at the input 241 of the NOR element 240 will cause the flip-flop FF1 to return to its original state.

An input terminal 130 of the Input I is connected through a delaying or discriminating resistor 131 to the input terminal 141 of the flip-flop FF1. The input terminal 130 is also connected to an input 151 of the coupling NOR element 150. The input terminal 130 is also connected to an input 171 of the NOR element 170. The first output 143 of the flip-flop FF1 is connected to an input 152 of the NOR element 150. The NOR output 153 of the NOR element 150 is connected to a first input 161 of the flip-flop element FF2. The first output 163 of the flip-flop FF2 is connected to an input 182 of the output NOR element 180. The output of the NOR element 170 at 172 is connected to the input 181 of the output NOR element 180. The output 183 of the NOR element 180 is connected to the output terminal 190 and is the Output line I for the apparatus of Fig. 3.

An input terminal 230 connects the Input II through a delaying or discriminating resistor 231 to a second input 241 of the flip-flop element FF1. The input terminal 230 is also connected to an input 251 of the coupling NOR element 250 and to an input 271 of the NOR element 270. A second output of the flip-flop element FF1 at 243 is connected to an input 252 of the coupling NOR element 250. The output 253 of the NOR element 250 is connected to a second input 261 of the flip-flop element FF2. A second output 263 of the flip-flop element FF2 is connected to an input 282 of the output NOR element 280. The output 273 of the NOR element 270 is connected to an input 281 of the output NOR element 280. The output of the NOR element 280 at 283 is connected to an output terminal 290 which is the Output II.

Each of the NOR logic switching units as shown in Fig. 3 may be identical. The resistances 131 and 231 are utilized to prevent the flip-flop unit FF1 from changing output stages before the coupling NOR units 150 or 250 are blocked by their incoming pulses. The apparatus of Fig. 3 utilizes logic operation only, thus eliminating any undesirable timing features which must be utilized in some prior art differential rate circuits.

Referring to Fig. 4 there is set forth an operation table which designates the output conditions of each of the NOR logic elements utilized in the apparatus of Fig. 3. The output of each NOR logic element, as hereinbefore described, is assumed to have two voltage levels which may be utilized in a binary system or a switching system. The output voltage level of each NOR element is assumed to be either a "zero" or a "one" level although varying voltage levels may be utilized as long as the output of each independent NOR logic element is of sufficient magnitude to operate a succeeding NOR logic element for purposes of this invention.

Let us assume that a first input pulse now appears on the Input I. Thus it may be seen that the following conditions, as noted in the table of Fig. 4, will now be present in the apparatus of Fig. 3. That is, the flip-flop element FF1 will have an output at 243 and no output at 143. Because of the input at the input terminal 130 the coupling NOR element 150 will not have an output. Because of the output from the flip-flop element FF1 at 243 the NOR element 250 will not have an output. The output conditions of the flip-flop element FF2 are as shown in the table as influenced by the coupling NOR logic elements 150 and 250. Therefore, there will be no output at the output terminal 190.

Following the operation table, as shown in Fig. 4, it may be seen that when a second pulse appears on Input I, without an input pulse arriving at Input II in the meantime, that the logic operation of the differential rate circuit of Fig. 3 produces an output from the NOR element 180 at the output terminal 190. Similarly, the arrival of two pulses without an intermediate pulse on the Input I, at Input II will cause an output from the NOR element 280 at 283 providing an output at the output terminal 290 and thus an output on Output II.

It can, therefore be seen that if pulses arrive alternately on lines I and II, there is no output on the Output lines I and II. If however, for example, three pulses come on Input line I and only one on Input II, then one of the pulses on input line I is canceled and the output on the Output line I is the difference between the two lines.

The differential frequency rate circuit of this invention may be also looked at in the following manner. That is, the circuit of the invention comprises first and second input lines I and II, first and second flip-flop elements FF1 and FF2, first and second output circuits 180 and 280, first and second gating circuits 170 and 270, and first and second coupling circuits 150 and 250 coupling the output of the first flip-flop element FF1 to the input of the second flip-flop element FF2. The first flip-flop element FF1 has first and second input means 141 and 241 and first and second output means 143 and 243. The second flip-flop element FF2 has first and second input means 161 and 261 and first and second output means 163 and 263. The first and second input lines I and II are respectively connected through discriminating resistors 131 and 231 to said first and second input means 141 and 241 of the first flip-flop element FF1. The first and second output means 163 and 263 of the second flip-flop element FF2 are respectively connected to inputs 182 and 282 of the first and second output circuits 180 and 280. The gating circuit means 170 and 270 are respectively operatively connecting the first and second input lines I and II to the output circuits 180 and 280 at inputs 181 and 281 so that the presence of a pulse on either of the input lines allows an output from the output circuit to which it is connected. The coupling circuit means 150 and 250 respectively operatively connect the first and second outputs 143 and 243 of the first flip-flop element FF1 to the first and second input means 161 and 261 of the second flip-flop element FF2. The first and second input lines I and II are respectively connected to the coupling circuit means 150 and 250 at the inputs 151 and 251. The presence of a pulse on either of the input lines is operative to prevent the coupling circuit means from producing an output to either of said first and second input means 161 and 162, respectively, of said second flip-flop element FF2. The coupling circuit means 150 and 250 produce output signals in the absence of an applied input signal to either of the inputs of the individual coupling circuit means. As explained hereinbefore, the output circuit means 180 and 280 also produce output signals in the absence of an applied input signal to either of the inputs of the individual output circuit means. The gating circuit means 170 and 270 produce output signals in the absence of an applied input signal.

In conclusion, it is pointed out that while the illustrated example constitutes a practical embodiment of my invention, I do not limit myself to the exact details shown, since modification of the same may be varied without departing from the spirit of this invention.

I claim as my invention:

1. A differential frequency rate circuit comprising, first and second input lines; first and second flip-flop elements;

each said flip-flop element having first and second input means and first and second output means; first and second output circuits; said first and second input lines being respectively connected to said first and second input means of said first flip-flop element; said first and second output means of said second flip-flop element being respectively connected to said first and second output circuits; gating circuit means respectively operatively connecting said first and second input lines to said first and second output circuit means so that the presence of a pulse on either of said input lines allows an output from said output circuit to which it is connected; coupling circuit means respectively operatively connecting said first and second output means of said first flip-flop element to said first and second input means of said second flip-flop element; said first and second input lines being connected to said coupling circuit means; with the presence of a pulse on either of said first and second input lines being operative to prevent said coupling circuit means from producing an output to either of said first and second input means, respectively, of said second flip-flop element.

2. A differential frequency rate circuit comprising, first and second input lines; first and second flip-flop elements; each said flip-flop element having first and second input means and first and second output means; first and second output circuits; said first and second input lines being respectively connected to said first and second input means of said first flip-flop element; said first and second output means of said second flip-flop element being respectively connected to said first and second output circuits; gating circuit means respectively operatively connecting said first and second input lines to said first and second output circuit means so that the presence of a pulse on either of said input lines allows an output from said output circuit to which it is connected; coupling circuit means respectively operatively connecting said first and second output means of said first flip-flop element to said first and second input means of said second flip-flop element; said first and second input lines being connected to said coupling circuit means; the presence of a pulse on either of said first and second input lines being operative to prevent said coupling circuit means from producing an output to said either of said first and second input means, respectively, of said second flip-flop element; each said flip-flop element having an output from said first means in response to a pulse applied to said second input means.

3. A differential frequency rate circuit comprising, first and second input lines; first and second flip-flop elements; each said flip-flop element having first and second input means and first and second output means; first and second output circuits; said first and second input lines being respectively connected through discriminating resistor means to said first and second input means of said first flip-flop element; said first and second output means of said second flip-flop element being respectively connected to said first and second output circuits; gating circuit means respectively operatively connecting said first and second input lines to said first and second output circuit means so that the presence of a pulse on either of said input lines allows an output from said output circuit to which it is connected; coupling circuit means respectively operatively connecting said first and second output means of said first flip-flop element to said first and second input means of said second flip-flop element; said first and second input lines being connected to said coupling circuit means; the presence of a pulse on either of said first and second input lines being operative to prevent said coupling circuit means from producing an output to said either of said first and second input means, respectively, of said second flip-flop element.

4. A differential frequency rate circuit comprising, first and second input lines; first and second flip-flop elements; each said flip-flop element having first and second input means and first and second output means; first and second output circuits; said first and second input lines being respectively connected through discriminating resistor means to said first and second input means of said first flip-flop element; said first and second output means of said second flip-flop element being respectively connected to said first and second output circuits; gating circuit means respectively operatively connecting said first and second input lines to said first and second output circuit means so that the presence of a pulse on either of said input lines allows an output from said output circuit to which it is connected; coupling circuit means respectively operatively connecting said first and second output means of said first-flop element to said first and second input means of said second flip-flop element; said first and second input lines being connected to said coupling circuit means; the presence of a pulse on either of said first and second input lines being operative to prevent said coupling circuit means from producing an output to said either of said first and second input means, respectively, of said second flip-flop element; each said flip-flop element having an output from said first means in response to a pulse applied to said second input means.

5. A differential frequency rate circuit comprising, first and second input lines; first and second flip-flop elements; each said flip-flop element having first and second input means and first and second output means; first and second output circuits; said first and second input lines being respectively connected to said first and second input means of said first flip-flop element; said first and second output means of said second flip-flop element being respectively connected to said first and second output circuits; gating circuit means respectively operatively connecting said first and second input lines to said first and second output circuit means so that the presence of a pulse on either of said input lines allows an output from said output circuit to which it is connected; coupling circuit means respectively operatively connecting said first and second output means of said first flip-flop element to said first and second input means of said second flip-flop element; said first and second input lines being connected to said coupling circuit means; the presence of a pulse on either of said first and second input lines being operative to prevent said coupling circuit means from producing an output to said either of said first and second input means, respectively, of said second flip-flop element, said coupling circuit means producing an output signal in the absence of an applied input signal.

6. A differential frequency rate circuit comprising, first and second input lines; first and second flip-flop elements; each said flip-flop element having first and second input means and first and second output means; first and second output circuits; said first and second input lines being respectively connected to said first and second input means of said first flip-flop element; said first and second output means of said second flip-flop element being respectively connected to said first and second output circuits; gating circuit means respectively operatively connecting said first and second input lines to said first and second output circuit means so that the presence of a pulse on either of said input lines allows an output from said output circuit to which it is connected; coupling circuit means respectively operatively connecting said first and second output means of said first flip-flop element to said first and second input means of said second flip-flop element; said first and second input lines being connected to said coupling circuit means; the presence of a pulse on either of said first and second input lines being operative to prevent said coupling circuit means from producing an output to either of said first and second input means, respectively, of said second flip-flop element; said output circuit means producing an output signal in the absence of an applied input signal.

7. A differential frequency rate circuit comprising, first and second input lines; first and second flip-flop elements; each said flip-flop element having first and second input means and first and second output means; first and second output circuits; said first and second input lines being respectively connected to said first and second input means of said first flip-flop element; said first and second output means of said second flip-flop element being respectively connected to said first and second output circuits; gating circuit means respectively operatively connecting said first and second input lines to said first and second output circuit means so that the presence of a pulse on either of said input lines allows an output from said output circuit to which it is connected; coupling circuit means respectively operatively connecting said first and second output means of said first flip-flop element to said first and second input means of said second flip-flop element; said first and second input lines being connected to said coupling circuit means; the presence of a pulse on either of said first and second input lines being operative to prevent said coupling circuit means from producing an output to either of said first and second input means, respectively, of said second flip-flop element; said gating circuit means producing an output signal in the absence of an applied input signal.

8. A differential frequency rate circuit comprising, first and second input lines; first and second flip-flop elements, each said flip-flop element having first and second input means and first and second output means; first and second output circuits; said first and second input lines being respectively connected to said first and second input means of said first flip-flop element; said first and second output means of said second flip-flop element being respectively connected to said first and second output circuits; gating circuit means respectively operatively connecting said first and second input lines to said first and second output circuit means so that the presence of a pulse on either of said input lines allows an output from said output circuit to which it its connected; coupling circuit means respectively operatively connecting said first and second output means of said first flip-flop element to said first and second input means of said second flip-flop element; said first and second input lines being connected to said coupling circuit means; the presence of a pulse on either of said first and second input lines being operative to prevent said coupling circuit means from producing an output to either of said first and second input means, respectively, of said second flip-flop element; said coupling circuit means producing an output signal in the absence of an applied input signal; said output circuit means producing an output signal in the absence of an applied input signal; said gating circuit means producing an output signal in the absence of an applied input signal.

9. A differential frequency rate circuit comprising first and second input lines; first and second flip-flop elements each having first and second input means and first and second output means; first and second output circuits; first and second NOR gating circuits respectively connecting said first and second input lines to said first and second output circuits; said first and second input lines being respectively connected to said first and second input means of said first flip-flop; first and second NOR coupling circuits respectively connecting said first and second output means of said first flip-flop to said first and second input means of said second flip-flop; circuit means respectively connecting said first and second input lines to said first and second NOR coupling circuits; said first and second output means of said second flip-flop being respectively connected to said first and second output circuits.

10. A differential frequency rate circuit comprising first and second input lines; first and second flip-flop elements each having first and second input means and first and second output means; first and second output circuits; first and second NOR gating circuits respectively connecting said first and second input lines to said first and second output circuits; said first and second input lines being respectively connected to said first and second input means of said first flip-flop; first and second NOR coupling circuits respectively connecting said first and second output means of said first flip-flop to said first and second input means of said second flip-flop; circuit means respectively connecting said first and second input lines to said first and second NOR coupling circuits; said first and second output means of said second flip-flop being respectively connected to said first and second output circuits; each said flip-flop element having an output from said first output means in response to a pulse applied to said second input means.

11. A differential frequency rate circuit comprising first and second input lines; first and second flip-flop elements each having first and second input means and first and second output means; first and second output circuits; first and second NOR gating circuits respectively connecting said first and second input lines to said first and second output circuits; said first and second input lines being respectively connected through discriminating resistor means to said first and second input means of said first flip-flop; first and second NOR coupling circuits respectively connecting said first and second output means of said first flip-flop to said first and second input means of said second flip-flop; circuit means respectively connecting said first and second input lines to said first and second NOR coupling circuits; said first and second output means of said second flip-flop being respectively connected to said first and second output circuits.

12. A differential frequency rate circuit comprising first and second input lines; first and second flip-flop elements each having first and second input means and first and second output means; first and second output circuits; first and second NOR gating circuits respectively connecting said first and second input lines to said first and second output circuits; said first and second input lines being respectively connected through discriminating resistor means to said first and second input means of said first flip-flop; first and second NOR coupling circuits respectively connecting said first and second output means of said first flip-flop to said first and second input means of said second flip-flop; circuit means respectively connecting said first and second input lines to said first and second NOR coupling circuits; said first and second output means of said second flip-flop being respectively connected to said first and second output circuits; each said flip-flop element having an output from said first means in response to a pulse applied to said second input means.

13. A differential frequency rate circuit comprising first and second input lines; first and second flip-flop elements each having first and second input means and first and second output means; first and second output circuits; first and second NOR gating circuits respectively connecting said first and second input lines to said first and second output circuits; said first and second input lines being respectively connected to said first and second input means of said first flip-flop; first and second NOR coupling circuits respectively connecting said first and second output means of said first flip-flop to said first and second input means of said second flip-flop; circuit means respectively connecting said first and second input lines to said first and second NOR coupling circuits; said first and second output means of said second flip-flop being respectively connected to said first and second output circuits; each said flip-flop element having an output from said first means in response to a pulse applied to said second input means; said output circuit means producing an output signal in the absence of an applied input signal.

References Cited in the file of this patent

UNITED STATES PATENTS 2,735,005 Steele ---------------- Feb. 14, 1956